UNITED STATES PATENT OFFICE.

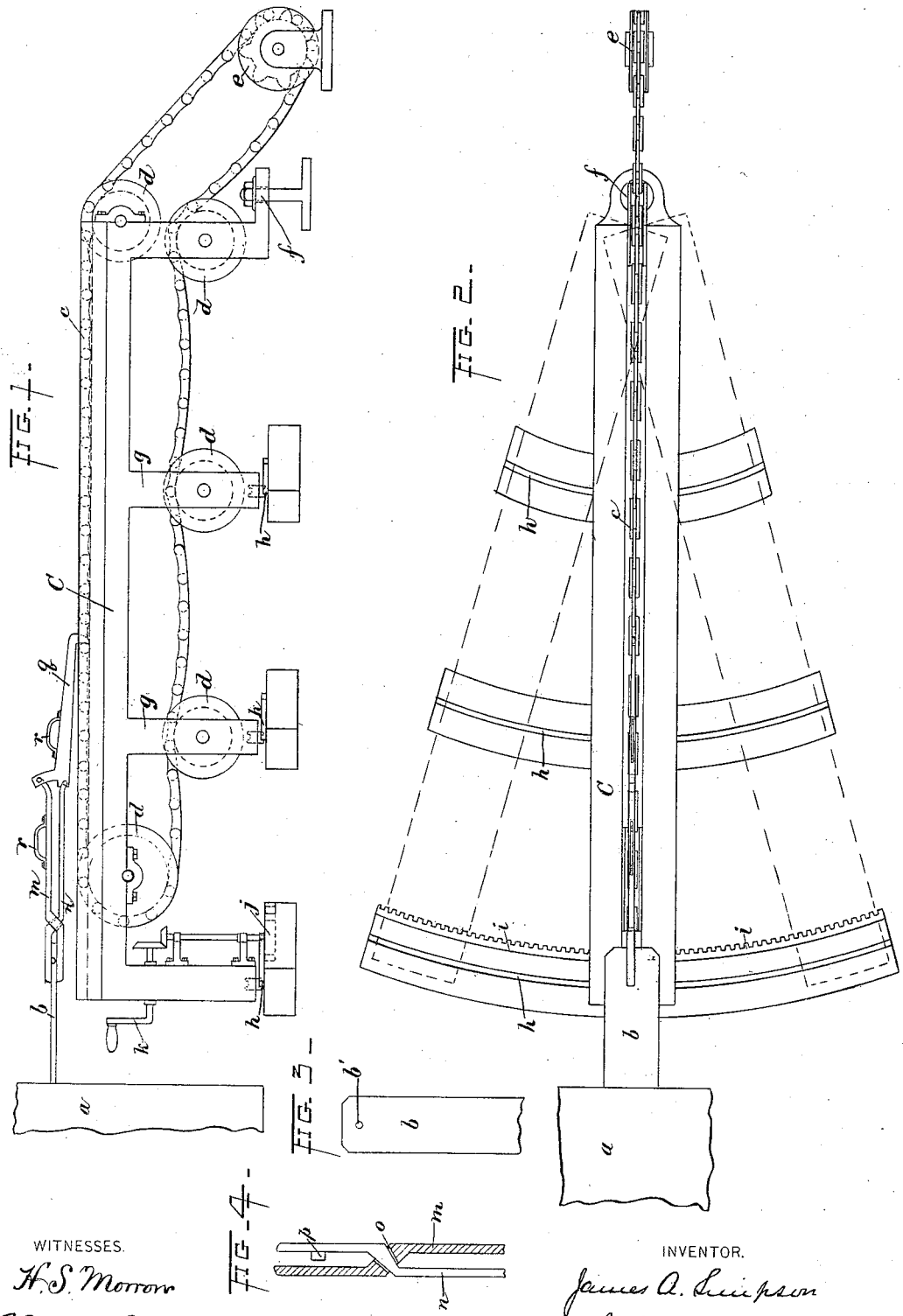

JAMES A. SIMPSON, OF McKEESPORT, PENNSYLVANIA.

APPARATUS FOR SKELPING OR TUBE-WELDING.

SPECIFICATION forming part of Letters Patent No. 407,306, dated July 16, 1889.

Application filed October 2, 1888. Serial No. 286,987. (No model.)

*To all whom it may concern:*

Be it known that I, JAMES A. SIMPSON, of McKeesport, in the county of Allegheny and State of Pennsylvania, have invented a new and useful Improvement in Skelping and Welding Devices; and I do hereby declare the following to be a full, clear, and exact description thereof, reference being had to the accompanying drawings, forming part of this specification, in which—

Figure 1 is a side elevation of my improved skelping table and tongs. Fig. 2 is a plan view of the same. Fig. 3 is a plan view of one end of the skelp-blank. Fig. 4 is a view, partially in section, of the jaws of the skelping-tongs.

Like letters of reference indicate like parts wherever they occur.

In the drawings, $a$ represents one of several heating-furnaces, in which the blank is heated before being drawn through the skelping dies or rolls, and $b$ represents the blank from which the skelp is formed. Situate in front of the mouth of the furnace $a$ is the skelping-table C, upon which is mounted the endless sprocket-chain $c$, supported by the wheels $d$, which are journaled in suitable bearings on the table and driven by the power sprocket-wheel $e$, situate at the end of the table, but separate therefrom. This table C is pivoted at its end farther away from the furnace, as at $f$, and is supported on standards $g$, which at their lower ends are provided with suitable rollers or slides fitting in the curved tracks $h$. The purpose of this pivotal arrangement is to enable the end of the table to be brought before the mouth of any one of a series of furnaces arranged side by side. The necessary movement of the table may be produced by means of the rack $i$, pinion $j$, and a lever $k$, connected with the pinion by a suitable shaft or shafts, the pinion-shafts and lever being connected with the table.

One of the methods of forming skelp-iron or welding tubing is to draw the heated blank from the furnace through skelping or welding dies by means of skelping-tongs, the jaws of the tongs biting on a "tang" which is welded to one end of the blank, the arms of the tongs being connected with the sprocket drawing-chain by a suitable hook. The chief objection to this method is the time and labor expended in welding the tang to the blank, and also the waste of material. To obviate these objections, my improved tongs are constructed as follows: The tongs are composed of two bars $m$ $n$, bent to the required shape. Instead of pivoting these bars together, a tapered slot $o$ is formed in the bar $m$, through which slot the bar $n$ passes, the bar being tapered at this portion to correspond with the taper of the slot. On the inner face of the jaw portion of the bar $n$ is a lug or projection $p$. The ends of the arms $m$ $n$ are pivoted to a hook $q$, which hook is adapted to engage with the sprocket-chain $c$, and is provided with a handle $r$. A similar handle is secured to the arm of the rod $m$.

By means of the handle $r$ on the hook $q$ the forward end of the hook may be raised or lowered, so that it shall act as a bell-crank lever on the arm $n$ of the tongs, whereby the arm $n$ is pushed forward in the slot $o$ and the jaws of the tongs are opened. By moving the hook $q$ in the opposite direction the arm $n$ is drawn back in the tapered slot $o$, whereby the jaws of the tongs are closed, so as to bite firmly on the blank. It will be noticed that when the hook $q$ is engaged with the sprocket-chain and the sprocket-chain is in motion power is applied directly to the arm $n$, so as to hold the blank firmly during the drawing operation.

Instead of welding a tang to the end of the blank $b$, a hole $b'$ is punched or formed in the end of the blank, with which hole the lug $p$ engages, so that when the hook $q$ is engaged with the sprocket-chain and the chain is set in motion the strain draws the jaws of the tongs together and a firm hold is secured on the end of the blank, the lug $p$ fitting in the hole $b'$.

Having thus described my invention, what I claim, and desire to secure by Letters Patent, is—

1. A skelping or tube-welding table pivoted at one end, so as to be capable of horizontal oscillation, and provided with an endless traveling chain, combined with skelping-tongs having a hook to engage said chain, substantially as and for the purposes described.

2. A skelping or tube-welding table pivoted at one end, so as to be capable of horizontal oscillation, and provided with an endless traveling chain, combined with skelping-tongs consisting of arms united by a slide-joint, said joint having inclined faces, and a hook to engage the chain, substantially as and for the purposes described.

3. A skelping or tube-welding table pivoted at one end, so as to be capable of horizontal oscillation, and provided with an endless traveling chain, combined with skelping-tongs consisting of arms united by a slide-joint, one of the arms being provided with a holding-lug, and a hook to engage the chain, and to which hook the arms of the tongs are secured, substantially as and for the purpose described.

In testimony whereof I have hereunto set my hand this 22d day of September, A. D. 1888.

JAMES A. SIMPSON.

Witnesses:
    JAMES K. BAKEWELL,
    W. B. CORWIN.